(12) United States Patent
Kikinis

(10) Patent No.: US 8,812,666 B2
(45) Date of Patent: Aug. 19, 2014

(54) REMOTE PROXY SERVER AGENT

(75) Inventor: Dan Kikinis, Saratoga, CA (US)

(73) Assignee: Da Capital Fund Limited Liability Company, Dover, DE (US)

( * ) Notice: Subject to any disclaimer, the term of this patent is extended or adjusted under 35 U.S.C. 154(b) by 1773 days.

(21) Appl. No.: 10/037,842

(22) Filed: Jan. 2, 2002

(65) Prior Publication Data

US 2002/0103851 A1    Aug. 1, 2002

Related U.S. Application Data

(60) Provisional application No. 60/264,937, filed on Jan. 29, 2001.

(51) Int. Cl.
*G06F 15/173*    (2006.01)

(52) U.S. Cl.
USPC ........................................... 709/225; 709/223

(58) Field of Classification Search
CPC . H04L 63/0823; H04L 63/08; H04L 12/2602; H04L 63/0209; H04L 63/0272
USPC .................. 709/201, 202, 225, 249, 217–219
See application file for complete search history.

(56) References Cited

U.S. PATENT DOCUMENTS

| | | | |
|---|---|---|---|
| 5,696,898 A | 12/1997 | Baker et al. | 713/201 |
| 5,727,159 A | 3/1998 | Kikinis | 709/246 |
| 5,961,593 A | 10/1999 | Gabber et al. | |
| 6,076,109 A | 6/2000 | Kikinis | 709/228 |
| 6,104,716 A | 8/2000 | Crichton et al. | |
| 6,195,366 B1 | 2/2001 | Kayashima et al. | 370/475 |
| 6,324,648 B1 | 11/2001 | Grantges, Jr. | 713/201 |
| 6,633,905 B1 * | 10/2003 | Anderson et al. | 709/219 |
| 6,711,611 B2 * | 3/2004 | Hanhan | 709/218 |
| 6,928,479 B1 | 8/2005 | Myer et al. | |
| 6,970,935 B1 * | 11/2005 | Maes | 709/230 |
| 2002/0118671 A1 * | 8/2002 | Staples et al. | 370/352 |
| 2004/0019638 A1 * | 1/2004 | Makagon et al. | 709/204 |

FOREIGN PATENT DOCUMENTS

| | | |
|---|---|---|
| JP | 10-254807 | 9/1998 |
| JP | 10-285216 | 10/1998 |
| JP | 2000-236353 | 8/2000 |
| WO | WO 00/02358 A1 | 1/2000 |
| WO | WO-00/41416 A1 | 7/2000 |
| WO | WO-01/03398 A2 | 1/2001 |

OTHER PUBLICATIONS

U.S. Appl. No. 60/264,937, Dan Kikinis.
"WAP-195-WAEOverview; version May 29, 2000". http://www.wapforum.org/what/technical_1_2_1.htm, Jul. 20, 2000.

(Continued)

*Primary Examiner* — Peling Shaw

(57) ABSTRACT

A software system for enabling remote data access to and task execution on a data processing system through a proxy server has an instance of the software residing on the data processing system for receiving and analyzing requests and performing according to request directive, and an instance of the software residing on the proxy server for identifying and authenticating a user and for redirecting requests to the data processing system. The system is characterized in that a user connects to a network accessible to the data processing system and initiates a request for services, wherein the request is after authentication of the user, redirected from the proxy server to the data processing system for task execution and possible return of results according to the contents of the request.

33 Claims, 3 Drawing Sheets

(56) References Cited

OTHER PUBLICATIONS

Leavitt, N. "Will WAP Deliver the Wireless Internet?" *Computer*, vol. 33, No. 5, pp. 16-20, May 1, 2000. IEEE Service Center, Los Alamitos, CA.

Kaasinen, E.; Aaltonen, M.; Kolari, J.; Melakoski, S.; Laakko, T. "Two Approaches to Bringing Internet Services to WAP Devices." *Computer Networks*, vol. 33, No. 1-6, pp. 231-246, Jun. 1, 2000. Elsevier Science Publishers B.V., Amsterdam, NL.

* cited by examiner

REMOTE PROXY SERVER AGENT

CROSS REFERENCE TO RELATED DOCUMENTS

The present invention claims priority to a U.S. provisional patent application serial No. 60/264,937 filed on Jan. 29, 2001 entitled "Remote Proxy Agent".

FIELD OF THE INVENTION

The present invention is in the field of network communications and equipment and pertains particularly to a method and apparatus for providing mid-range proxy services for small business.

BACKGROUND OF THE INVENTION

In the field of network access and communications, data servers known as proxy servers are very common and well known. A proxy server is, in basic form, an entity that caches information from a Web server or servers and acts as an intermediary agent between a Web client and that sever or servers. Often, a proxy is used to enable a wireless device with limited browsing capability to access Internet-sourced information that is sometimes stored in formats foreign to the device. By storing the most recent information from servers it has access to, the proxy server attempts to fill user requests with the cached information without navigation to the information source, thereby providing faster and more streamlined access to the information requested. Server security is also enhanced when using a proxy server, which can act as a firewall.

Large enterprises typically use proxy services to provide organized access to specified data for enterprise-approved individuals. Often access to the specified data is practiced from an Intranet. An intranet is any corporate wide-area-network that is a protected network that is protected from unauthorized access. An Intranet is usually reserved for select company employees and the like. Employees granted access to the World Wide Web from the Intranet would typically set up a proxy server in order to obtain Web browsing capability from behind a security firewall. In some cases, a proxy is used for interface between two disparate computing environments as referred to above. For example, an Internet-capable telephone would browse the Web using a proxy server (gateway) and so on.

In most cases, proxy services are implemented and maintained by corporate entities having the resources and wherewithal to maintain services for a large corporate population or service base. This involves the cost of setting up and maintaining the required machine or machines and software within the network. In contrast, an individual consumer who just surfs the Internet has very little or no requirement for proxy services. However, a consumer may configure for access to services through a proxy maintained by such as the consumer's Internet Service Provider (ISP).

There is a market for proxy services that is essentially not addressed in prior art. This market is the middle segment comprising small businesses or (cooperative) groups of business individuals that cannot afford to implement and maintain complex proxy services and may not have access to corporate Intranet. These smaller entities often have an ongoing and real need for the types of services available from a proxy service package.

Therefore, what is clearly needed is a remote proxy agent and system that could be shared in terms of use and cost by a group of small business users. Such an agent and system would offer many more and complex services than those available to consumers through a standard service provider but would not require the prohibitive expense and technical expertise required to implement corporate solutions.

SUMMARY OF THE INVENTION

In a preferred embodiment of the present invention a software system for enabling remote data access to and task execution on a data processing system through a proxy server is provided, comprising an instance of the software residing on the data processing system for receiving and analyzing requests and performing according to request directive, and an instance of the software residing on the proxy server for identifying and authenticating a user and for redirecting requests to the data processing system. The system is characterized in that a user connects to a network accessible to the data processing system and initiates a request for services, wherein the request is after authentication of the user, redirected from the proxy server to the data processing system for task execution and possible return of results according to the contents of the request.

In one preferred embodiment the data processing system is a personal computer. In another the data processing system is a multi-purpose printing center. In yet another the data processing system is a computer-connected peripheral. Also in a preferred embodiment data access includes directory search and opening of a target file.

Tasks performed may include sending e-mails and electronic faxes, and may further include reading a document over a dialed telephone connection, and powering on or off of host-connected devices.

The proxy server may, in some embodiments, be a wireless gateway in a wireless data network. Also in some embodiments the proxy server may be accessed with a wireless network-capable device, which may be a WAP enabled cellular phone.

In some cases a request specifies a serial execution of serial tasks and return of results. Many requests may be sent to the data processing system in an uninterrupted data session, in a preferred embodiment.

In another aspect of the invention a software proxy agent residing in a data processing system and interfaced operationally to at least one software application of the system is provided. comprising a request analyzer for parsing and verifying received requests, a request processor for processing the request for task-performance instructions, at least one application program interface for enabling remote control of the at least one application, and a results processor for computing and/or compiling results. The proxy agent is characterized in that the agent, through the appropriate application program interface, executes the appropriate application to achieve the goal or goals specified in the request and wherein result or results of the application performance are returned to the user that initiated the request.

In some preferred embodiments the data processing system is a personal computer. In others the data processing system is a multi-purpose printing center. In still others the data processing system is a computer-connected peripheral. Also in preferred embodiments the at least one application includes an e-mail application, a word processing application, a facsimile application, a telephony application, and an operating system component application. In some cases the request analyzer, the request processor and the results processor utilize resident processing capability of the host device.

In yet another embodiment of the invention a method for remote control of a data processing system over a network by proxy comprising steps of (a) connecting to the network using a network capable device; (b) logging into a proxy server and authenticating for access; (c) formulating and sending a request directed to the data system to be controlled; (d) forwarding the request from the proxy server to a proxy agent at the data system; (e) performing at least one task specified in the request; and (f) returning results of task performance to the request initiator.

In some preferred embodiments, in step (a), the network capable device is a wireless, WAP enabled phone and the network is the Internet network. Also in some preferred embodiments, in step (b), the proxy server is a gateway between the wireless network and the Internet. In still other preferred embodiments, in step (e), the at least one task is performed through application program interface between the proxy agent and the specified application. In some other embodiments, step (e), the at least one task is performed by an operating system component of the data processing system. In some cases steps (a) through (e) are conducted repeatedly in the course of a single data session between a user and the data system.

BRIEF DESCRIPTION OF THE DRAWINGS FIGURES

DESCRIPTION OF THE PREFERRED EMBODIMENTS

According to a preferred embodiment of the present invention, the inventor provides a shared proxy system managed for optimum function that can provide services not normally available to small business using wireless applications.

Figure 1:
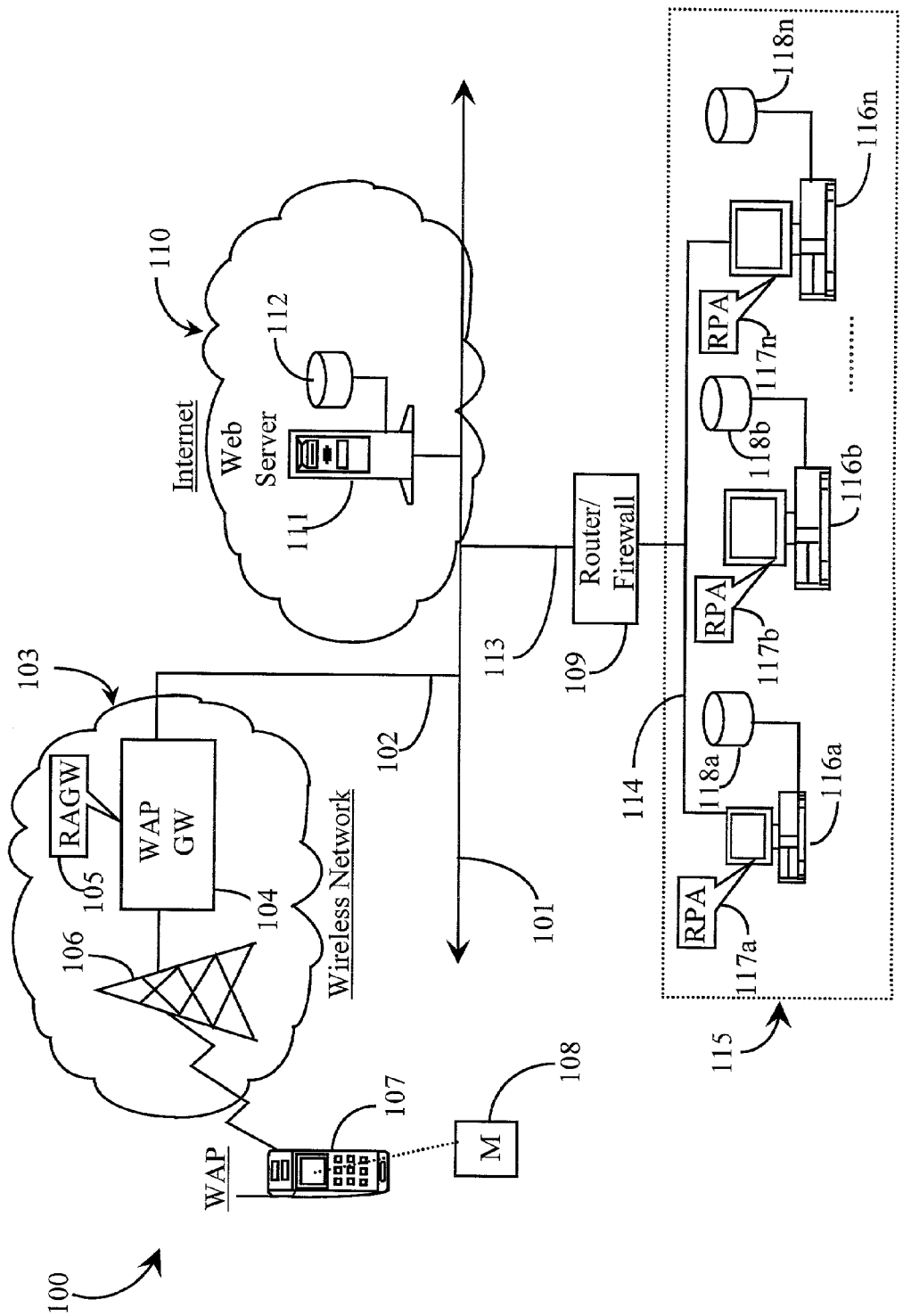
FIG. 1 is an overview of a communication network practicing a remote proxy capability according to an embodiment of the present invention.

FIG. 1 is an overview of a communications network practicing a remote proxy service capability according to an embodiment of the present invention. Communications network 100 comprises sub-networks 110, which is, in this example the Internet network, and 103, which is described and labeled in this example as a wireless network. Internet network 110 may instead be any wide-area-network (WAN) that is public or private or a corporate Intranet, and does not depend on a particular technology. The inventor chooses the Internet in this example as a preferred embodiment. Likewise, wireless network 103 may be any typical wireless access network having access capability to network 110. Additional examples of network types my also include terrestrial and satellite based wireless, laser based, cable, telephony, or dedicated wiring, or any combinations of those.

Wireless network 103 is generally represented herein by 3 exemplary components. These are a wireless-application-protocol (WAP) enabled digital phone 107, a wireless transmission tower 106, and a WAP gateway (WAP-GW) 104. WAP phone 107 is Internet-capable according to WAP as is generally known in the art. Phone 107 has a micro browser (M) 108 operational therein and adapted to browse WAP-enabled Web pages or Web pages of a disparate format by proxy. WAP-enabled sites are those sites that are adapted to serve data according to WAP. Many Web sites of importance relating to accessible data have WAP versions of the site accessible through WAP devices. WAP-GW 104 is a network gateway or proxy between wireless network 103 and Internet network 110.

In this example, the wireless scheme practiced is WAP as exemplified by a WAP-enabled device (phone 107) and a WAP-enabled gateway (WAP-GW 104), however, proprietary technologies other than WAP may be practiced in accordance with the present invention including but not limited to those technologies offered by various vendors of communication services including but not limited to Aether™, NTT I-Mode™, Symbian™, Microsoft™, Qualcomm™, and other currently existing or new vendors.

Lines, connection points, and equipment of Internet network 110 are symbolically represented herein by a double-arrow backbone illustrated herein as extending through Internet cloud 110 labeled with the element number 101. Backbone 101 represents the outward extension of Internet 110 in all directions and therefore symbolizes limitless geographic reach.

A Web server 111 is illustrated within Internet 110 and connected to backbone 101 Web server 111 represents a hosted server available on-line wherein electronic documents are stored and are available for user access. Actual Web data served by server 111 is stored in a data repository 112 connected thereto. Repository 112 may be an internal repository or an external one as shown in this example. The inventor illustrates an external repository to illustrate optional separate function. Server 111 is presumed, in this embodiment, to be hosted by a third party such as an Internet service provider (ISP) and shared by several small businesses or business users. In one embodiment, server 111 may be hosted by a single business.

A provider entity of Web server 111 is represented in this example as a small business 115 (enclosed by a dotted rectangle). The term provider as used in this example simply means that business 115 provides data that is made available through server 111. Server 111 may be hosted by business 115 or by a third party.

Small business 115 is represented in terms of communication and service equipment by a plurality of PC workstations 116a-166n. The number of workstations 116a-n is arbitrary. That is to say that there may be several, a few or only one workstation depending on the size of business 115, which is presumed to be small. In another embodiment, PC workstations 166a-n may be unrelated to one another in terms of belonging to a same business. Instead they may be workstations of business users that represent separate small business users.

In this example, PC workstations 116a-n share a local area network (LAN) 114 and are presumed to be stations of a single business. In an alternate case of separate business users, there may be no LAN present. Rather, the stations may be remote from one another but have direct Internet access capability to Internet 110 and therefore server 111.

Each workstation 116a-n has a data repository connected thereto for storing business, contact and other data. For example, PC station 116a has a repository 118a connected thereto while PC station 116b has a repository 118b connected thereto and so on. Workstations 116a-n are not construed in this embodiment to be limited to PC functionality such as IP calls, e-mail and so on. In addition, COST telephones, Facsimile machines, Scanners, automated peripherals and other equipment not shown in this example may be part of individual workstation communication capabilities.

It is noted herein that small business 115 does typically not operate on a shared corporate WAN, and does not, typically, individually host and maintain a proxy server. A router 109 is illustrated in this example as a routing point between Internet 110 and small business 115. Small business 115 has a permanent access line 113 to Internet 110, which could be for example, a digital subscriber line (DSL), a fiber optic connection, a wireless radio connection, a Local Multipoint Distribution Service (LMDS), a cable/modem connection, and so on. Such persistent connection types typically use firewall technology and address translation capability, along with agent routing capability often implemented within one machine such as router 109. It is also assumed in this example that business 115 uses an ISP to gain Internet connectivity.

Each PC workstation 116*a-n* within the domain of business 115 has a novel instance of remote proxy agent (RPA) installed thereon. These instances are represented as RPA 117*a* on PC 116*a*, RPA 117*b* on PC 116*b*, and RPA 117*n* on PC 166*n*. In this example, there is an instance of RPA for every illustrated workstation; however in actual practice all workstations associated with business 115 may not be enhanced with an instance of RPA. Whether it is available or not on any one machine will depend in part on normal security concerns and whether or not remote users may need to access a particular PC or other device within business 115. RPA is adapted to render its host PC as a server capable of filling requests according to demand.

An object of the present invention is to provide viable proxy services to mobile users (phone 107) that normally would not be practical such as being able to look up a document on a desktop machine (166*a-n*) in the office or to send an email by proxy even though the company (business 115) is small and may have just two or three employees and no real Intranet or Web services other than typical Web pages hosted for company 115 on an ISP server such as server 111. RPA instances 118*a-n* provide the capability in conjunction with an instance of remote agent gateway (RAGW) 105 installed and operational in WAP-GW 104 within wireless network 103.

In a preferred embodiment, WAP phone 107 in practice operated by a remote user, connects to a proxy server such as is exemplified in WAPGW 104 (proxy software not illustrated) having RAGW 105 operational therein. From WAPGW 104, phone 107, using micro-browser 108, connects to any server within Internet 110 such as the illustrated server 111. In addition, when any of PCs hosting RPA are logged into and registered with WPAGW 104, a user operating WAP phone 107 may access a designated PC 116*a-n* to perform certain tasks, access certain information and so on. Typically, a user operating WAP phone 107 is an employee or another trusted associate of business 115. In one embodiment, trusted clients may be given access to certain business machine such as any one or more of PCs 116*a-n*.

Figure 2:
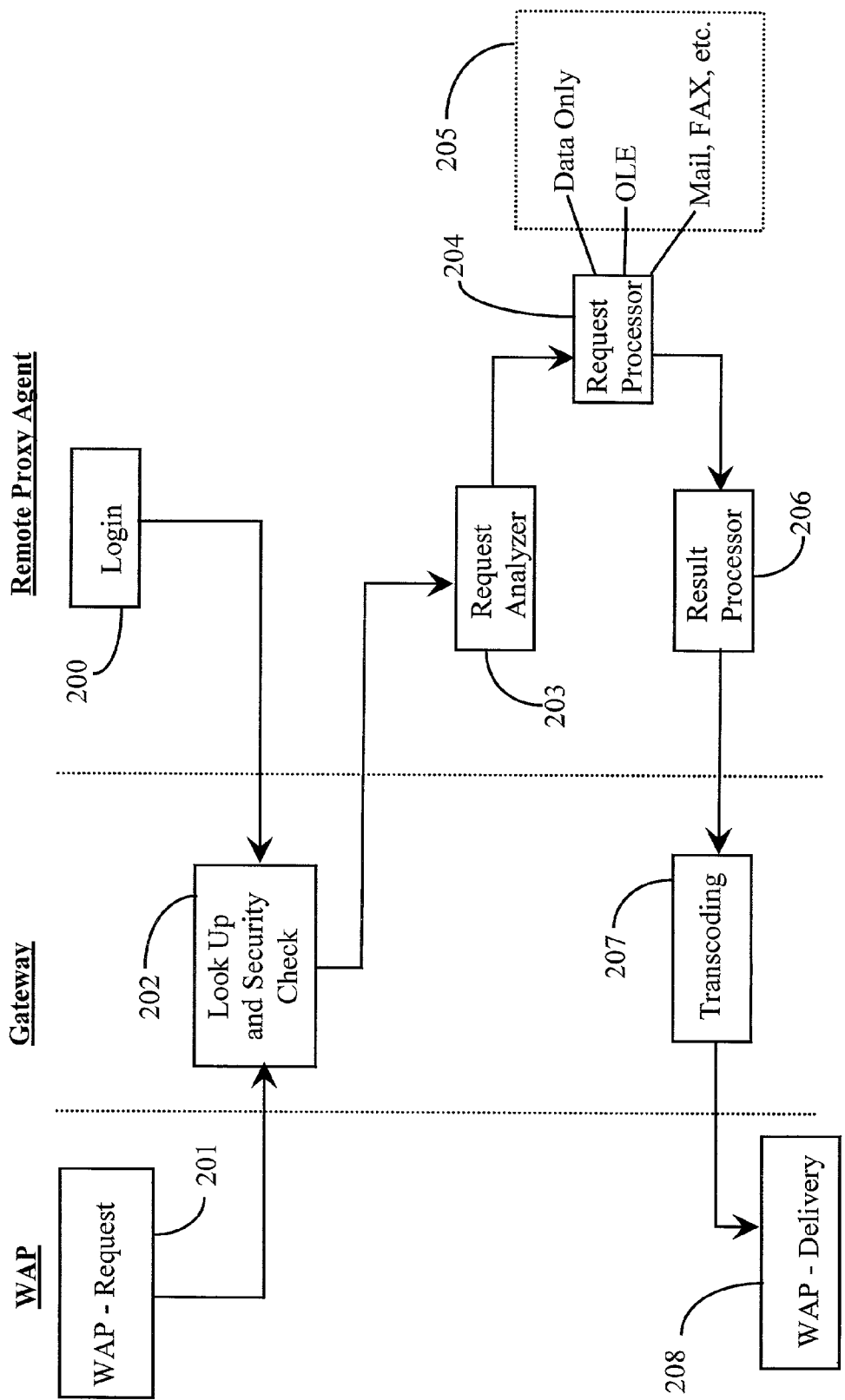
FIG. 2 is a block diagram illustrating remote proxy function according to an embodiment of the present invention.

FIG. 2 is a block diagram illustrating remote proxy function according to an embodiment of the present invention in view of the example of FIG. 1. When an instance of remote proxy agent RPA as described with reference to FIG. 1 is launched, it performs an automatic login procedure with the WAP gateway also described with reference to FIG. 1. The described login is illustrated in this example as Login 200 in the domain of Remote Proxy Agent as is indicated. The domains are separated by vertical dotted lines. A directional arrow emanating from Login 200 and progressing toward the domain of Gateway illustrates direction of transaction.

Within the domain labeled Gateway an identification and security check 202 is performed at the gateway, which is analogous to WAP-GW 104 of FIG. 1. Once the RPA hosting machine is logged in, it waits in the background for activity. This activity will come in the form of a remote request. It is noted herein that login 200 would typically happen on the designated gateway of the remote wireless service provider of the user whose business machine hosts the RPA instance. This gateway hosts RAGW software previously described. In one embodiment, a third party and not the provider of the user's wireless network might host the gateway. In this case, the user will need to enter the URL or other location indicator of the designated gateway hosting the RAGW instance of software.

A WAP request 201 is illustrated in this example as originating in the domain labeled WAP and may be assumed in this example to originate from the WAP-enabled phone described with reference to FIG. 1. A directional arrow emanating from WAP request 201 and progressing toward the domain of gateway illustrates the direction of the request. The gateway receives WAP request 201 and performs a lookup and security check 202 as was done for the login procedure 200. The lookup portion of function 202 identifies the correct RPA of the user's business machine he or she is authorized to access by proxy. Likewise a security check is performed, for example, by sending a simple challenge requiring the user to enter PIN codes or the like. The result is then hashed and sent back for verification. This kind of security is well known in the art and is not shown in great detail, for reasons of simplicity. In one embodiment, users working at a same business analogous to business 115 of FIG. 1 may grant each other access rights to each other's machines. In this case, a user may have access to more than one RPA and may be required to execute more than one password or PIN for each machine.

Referring now back to FIG. 2, after performing task 202 with regard to WAP request 201 received, the gateway sends the approved request to a request analyzer 203 within the RPA domain, which in a preferred embodiment is a RPA-enhanced PC or other peripheral or standalone device designated as accessible to the particular authorized user. In the case of a PC as was described with reference to PCs 116*a-n* of FIG. 1 above, appropriate application program interfacing (API) is implemented to allow interface between RPA and communication programs, word processing programs including file search and access capability, object linking and embedding (OLE) capability and so on. In the case of a fax machine or multi-purpose printing/scanning/communication center, RPA software may interface directly (if standalone) or through a connected PC having access to those peripheral devices.

Once the request is determined to be valid by analyzer 203, it is sent to RPA processor 204, typically a PC processor running the RPA software, as illustrated by directional arrows. It is noted herein that analyzer 203 is presumed to reside on the host machine as part of the RPA instance. RPA running on the host device processes the approved request for whatever task or tasks are specified in the request and according to authorized capability afforded to the requesting user. One with skill in the art will recognize that configurations for different users may very widely and are dependant on security issues, type of business, enterprise policy, and so on.

A box 205 illustrated as a dotted rectangle associated with processor 204 represents some options for processing a received and verified request. For example, it may be that the requesting user is authorized to access and read data only as illustrated as a first option within box 205. Perhaps a request involves OLE capability as illustrated with the second option in box 205. Perhaps a request is authorized to cause sending of e-mail, Fax, or other notification events as illustrated by the third option within box 205. In one embodiment there may be a serial "session" identified in a request, the session involving serial invocation and execution of more than one event. There are many possibilities.

Depending on the content of a request and subsequent RPA processing (204), there may be a computed or processed result, illustrated herein as result 206 that is propagated, eventually, back to the requesting user. Result 206 may be a simple confirmation of action, a notification of error in request processing or request approval, or returned hard data requested by the user. Result 206 is transcoded if necessary at the domain of the gateway as illustrated herein by a transcoding step 207. Transcoding the data renders the data viewable to the requesting device. Any return data is delivered from the domain of the gateway to a requesting device, in this case, a WAP enabled phone, as illustrated by a box illustrated within the WAP domain labeled WAP Delivery and given the element number 208.

In one embodiment, processor 204 may involve launching an application by, for example, OLE on a PC, or some other similar technique for launching of scripts and shells depending of course on the operating system of the machine on which the application is launched. Accessed documents may be e-mailed to a specified e-mail address or e-mail list, documents may be faxed to specified fax numbers, documents may be read into a phone number, etc. In one embodiment, a request may be for the purpose of powering on or off certain devices that are connected to the RPA host device. Many tasks are conceivable.

Figure 3:
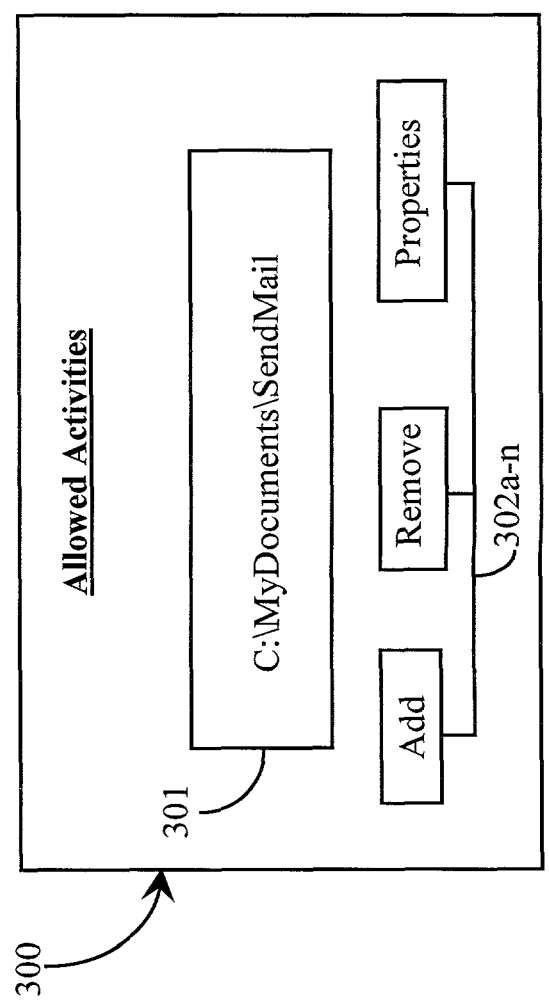
FIG. 3 is a block diagram illustrating a screen shot of proxy constraints according to an embodiment of the present invention.

FIG. 3 is a block diagram illustrating a screen shot of configured proxy constraints according to an embodiment of the present invention. A window 300 is provided as part of RPA GUI and adapted to enable configuration of RPA parameters and level of enhancement. Window 300 is user-activated and operable by a user through normal cursor or keyboard conventions. If RPA is provided to a standalone device with limited input and visual display, window 300 would be tailored for optimum display and user interaction for the particular device.

In this example, a constraint 301 is illustrated. Constraint 301 essentially limits user access and function ability to C: My Documents for accessing data and the function of Send Mail. This constraint simply means that the accessing user can only read from My Documents and can e-mail any document in My Documents to an e-mail address or e-mail group.

Optional function icons 302a-n illustrated under constraint window 301 provide additional capability as desired and allowed. For example, Add, Remove, and Properties functions are available for a user to implement with respect to the access-authorized section of My Documents. Likewise, options of an associated e-mail program would only be applicable to the authorized My Documents section. For example, the well-know e-mail function "insert file" would only be operable if the file inserted is in the My Documents section. In one embodiment under certain restrictions, an authorized user is able to configure RPA from a remote location to add or limit constraints and change parameters. A sample scenario following the constraints of window 300 is presented below:

1. Request: Where on drive c: is the document "Joe123.doc"?
2. Result: "C:\Mydocuments\misc\Joe1123.doc".
3. Next request: Mail it to Joe Shmoe.
4. Result: Message sent—you want receipt?
5. Next request: Yes.
6. Result (may be a while later): Return receipt received from SMPT@XYZcorp.com.

The process detailed above may involve just one "session" between a requesting device and an RPA host. Security cookie exchange between the RPA and the gateway server at the time of login of the RPA can guarantee that the RPA only accepts commands from the gateway or server that it has authorized to give it commands, which is the same server that the user has authorized to be used.

Such a scheme as detailed above reduces the risk of IP spoofing. IP spoofing is a known technique used to gain unauthorized access to computer systems whereby the intruder sends messages to a computer with an Internet Protocol address indicating that message is coming from a trusted host. In the case of document send from a server, the user does not have to worry about uploading any data.

The present invention can be practiced over the Internet and any connected sub network wireless or not without departing from the spirit and scope set forth in this specification. Users allowed access to RPA enhanced machines may represent employees of a same business, separate business individuals cooperating to serve a common customer base, VIP clients or associates of business employees and so on. There are many customizable situations that are possible.

The method and apparatus of the present invention should be afforded the broadest possible scope under examination. The spirit and scope of the present invention is limited only be the claims that follow.

What is claimed is:

1. A system for enabling remote access to applications residing on a processing system comprising:
a firewall system interposed between a first system and a second system, wherein the first system comprises:
a user device connected to a gateway via a first network, wherein the user device comprises a client; and
a gateway connected to an insecure side of the firewall via a second network, wherein the gateway comprises an instance of a remote gateway agent,
wherein the second system comprises:
a processing system connected to a secure side of the firewall, wherein the processing system comprises an instance of a remote proxy agent and at least one application,
wherein the remote gateway agent is configured for:
receiving at the remote gateway agent a client registration request from the remote proxy agent, wherein the client registration request creates a client-to-server connection through the firewall between the remote proxy agent and the remote gateway agent;
receiving a request from the user device for a task to be performed by the at least one application residing on the processing system; and
forwarding the task request to the remote proxy agent residing on the processing system via the remote gateway agent, and
wherein the remote proxy agent comprises an interface to the at least one application and is configured for:
sending the client registration request to the remote gateway agent;
receiving and analyzing the task request from the remote gateway agent;
selecting and executing the at least one application via the interface to process the request; and
sending a result from the remote proxy agent to the remote gateway agent via the client-to-server connection through the firewall.

2. The system of claim 1, wherein the processing system is selected from the group consisting of a personal computer, a multipurpose printing center, and a computer-connected peripheral.

3. The system of claim 1, wherein the at least one application is selected from the group consisting of an e-mail application, a word processing application, a facsimile application, a telephony application, and an operating system component application.

4. The system of claim 1, wherein the request is selected from the group consisting of searching a directory, opening a target file, accessing an e-mail application, sending a fax, reading a document over a dialed telephone connection, powering on a device connected to the one or more data processing computers, and powering off the device connected to the one or more data processing computers.

5. The system of claim 1, wherein the remote gateway agent is further configured for determining whether the user device is entitled to direct the request to the processing system.

6. The system of claim 1, wherein the first network is a wireless network and the user device is a wireless device.

7. The system of claim 1, wherein the second network is the Internet.

8. The system of claim 1, wherein the request specifies a serial execution of serial tasks and return of results.

9. The system of claim 1, wherein a plurality of requests is sent to the one or more data processing computers in an un-interrupted data session.

10. The system of claim 1, wherein the remote gateway agent is further configured for receiving the result, and sending at least part of the result to the user device via the first network.

11. The system of claim 10, wherein the gateway server instance is further configured for transcoding the result for viewing by the user device prior to sending the result to the user device.

12. A method for enabling remote data access to applications residing on a processing system comprising:
configuring a remote proxy agent on the processing system;
configuring a remote gateway agent on a gateway;
interposing a firewall between the processing system and the gateway, wherein the processing system resides on the secure side of the firewall and the gateway resides on the insecure side of the firewall;
receiving at the remote gateway agent a client registration request from a remote proxy agent, wherein the client registration request creates a client-to-server connection through the firewall;
registering the remote proxy agent with the remote gateway agent;
configuring an interface between the remote proxy agent and the at least one application residing on the processing system;
receiving at the remote gateway agent a request for access to the processing system from a user device via a first network;
forwarding the request for access to the processing system;
receiving and analyzing the request from the remote gateway agent at the remote proxy agent;
executing the selected application via the interface to process the request; and
sending a result from the remote proxy agent to the remote gateway agent via the client-to-server connection through the firewall.

13. The method of claim 12, wherein the processing system is selected from the group consisting of a personal computer, a multipurpose printing center, and a computer-connected peripheral.

14. The method of claim 12, wherein the at least one application is selected from the group consisting of an e-mail application, a word processing application, a facsimile application, a telephony application, and an operating system component application.

15. The method of claim 12, wherein the request is selected from the group consisting of searching a directory, opening a target file, accessing an e-mail application, sending a fax, reading a document over a dialed telephone connection, powering on a device connected to the one or more data processing computers, and powering off the device connected to the one or more data processing computers.

16. The method of claim 12 further comprising determining at the remote gateway agent whether the user device is entitled to direct the request to the processing system.

17. The method of claim 12, wherein the first network is a wireless network and the user device is a wireless device.

18. The method of claim 12, wherein the second network is the Internet.

19. The method of claim 12, wherein the request specifies a serial execution of serial tasks and return of results.

20. The method of claim 12, wherein a plurality of requests is sent to the one or more data processing computers in an un-interrupted data session.

21. The method of claim 12 further comprising receiving the result at the remote gateway agent and sending at least part of the result to the user device via the first network.

22. The method of claim 21 further comprising transcoding the result for viewing by the user device prior to sending the result to the user device.

23. A remote proxy agent residing in a processing system for enabling remote data access applications comprising:
a registration processor comprising instructions for sending a registration request to a remote gateway agent residing on a gateway via a first network, wherein the client registration request creates a client-to-server connection through a firewall interposed between the remote proxy agent and the remote gateway agent and wherein the gateway is accessible to a user device via a second network;
a request analyzer configured for receiving, parsing and verifying a task request forwarded by the remote gateway agent from the user device;
a request processor configured for processing the task request for task-performance instructions;
an application program interface configured for sending the task-performance instruction to at least one application residing on the processing system; and
a results processor configured for sending a result from the software application to the remote gateway agent for forwarding to the user device.

24. The remote proxy agent of claim 23, wherein the processing system is selected from the group consisting of a personal computer, a multipurpose printing center, and a computer-connected peripheral.

25. The remote proxy agent of claim 23, wherein the at least one application is selected from the group consisting of an e-mail application, a word processing application, a facsimile application, a telephony application, and an operating system component application.

26. The remote proxy agent of claim 23, wherein the request is selected from the group consisting of searching a directory, opening a target file, accessing an e-mail application, sending a fax, reading a document over a dialed telephone connection, powering on a device connected to the one or more data processing computers, and powering off the device connected to the one or more data processing computers.

27. The remote proxy agent of claim 23, wherein the remote gateway agent is further configured for determining whether the user device is entitled to direct the request to the processing system.

28. The remote proxy agent of claim 23, wherein the second network is a wireless network and the user device is a wireless device.

29. The remote proxy agent of claim 23, wherein the first network is the Internet.

30. The remote proxy agent of claim 23, wherein the request specifies a serial execution of serial tasks and return of results.

31. The remote proxy agent of claim 23, wherein a plurality of requests is sent to the one or more data processing computers in an un-interrupted data session.

32. The remote proxy agents of claim 23, wherein the remote gateway agent is configured for receiving the result, and sending at least part of the result to the user device via the second network.

33. The remote proxy agent of claim 32, wherein the gateway server instance is further configured for transcoding the result for viewing by the user device prior to sending the result to the user device.

* * * * *